United States Patent [19]
Brown

[11] 3,714,708
[45] Feb. 6, 1973

[54] WIRE TERMINAL MAKING AND ASSEMBLING

[76] Inventor: Maurice H. Brown, 12521 S. 68th Court, Palos Heights, Ill. 60463

[22] Filed: Jan. 20, 1971

[21] Appl. No.: 108,065

[52] U.S. Cl. ............... 29/624, 29/630 D, 140/71.6, 219/234, 156/275
[51] Int. Cl. ..................... H01b 13/00, H05k 3/00
[58] Field of Search.....29/624, 630 D, 625; 264/249, 264/274; 219/234, 78; 140/71.6; 156/275

[56] References Cited

UNITED STATES PATENTS

| | | | |
|---|---|---|---|
| 2,162,234 | 6/1939 | Thomas | 29/630 D |
| 2,762,110 | 9/1956 | Ward | 29/630 D X |
| 2,942,332 | 6/1960 | Wright et al. | 29/630 D UX |
| 3,040,415 | 6/1962 | Rayburn | 29/630 D |
| 3,243,868 | 4/1966 | Anderson | 29/629 |
| 3,353,263 | 11/1967 | Helms | 29/628 X |
| 3,390,252 | 6/1968 | Storck | 219/234 |

Primary Examiner—Charles W. Lanham
Assistant Examiner—Robert W. Church
Attorney—Parker, Carter & Markey

[57] ABSTRACT

A method of forming a wire terminal and attaching it to a thermoplastic support member for a coil form. The terminal is formed from a continuous piece of wire by bending one end of the wire into a modified U-shaped configuration having one leg of the U-bent intermediate its length to extend at right angles to the other leg and severing the wire configuration from the continuous piece of wire. The wire configuration or terminal is then transported in supporting contact with a pair of electrodes to a position adjacent a thermoplastic support member. The terminal is heated by means of electrical current passed through the electrodes. While hot, the terminal and the thermoplastic support member are brought into engagement with each other to embed the bight portion of the terminal in the thermoplastic material by fusion of the thermoplastic material due to the heat of the terminal. The electrodes are then removed from the terminal leaving the terminal embedded in the thermoplastic support member.

6 Claims, 8 Drawing Figures

INVENTOR.
Maurice H. Brown
BY Parker, Carter & Markey
Attorneys.

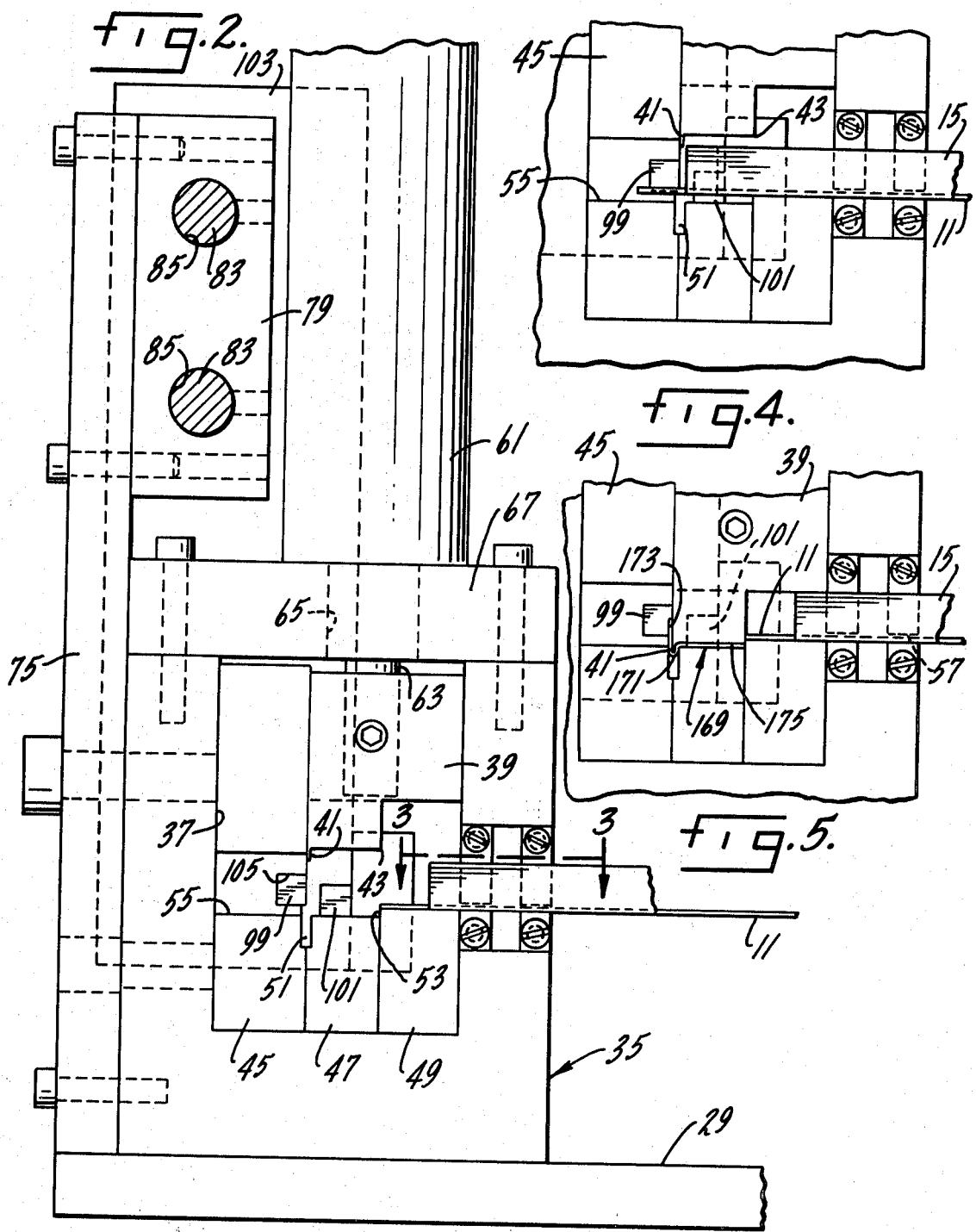

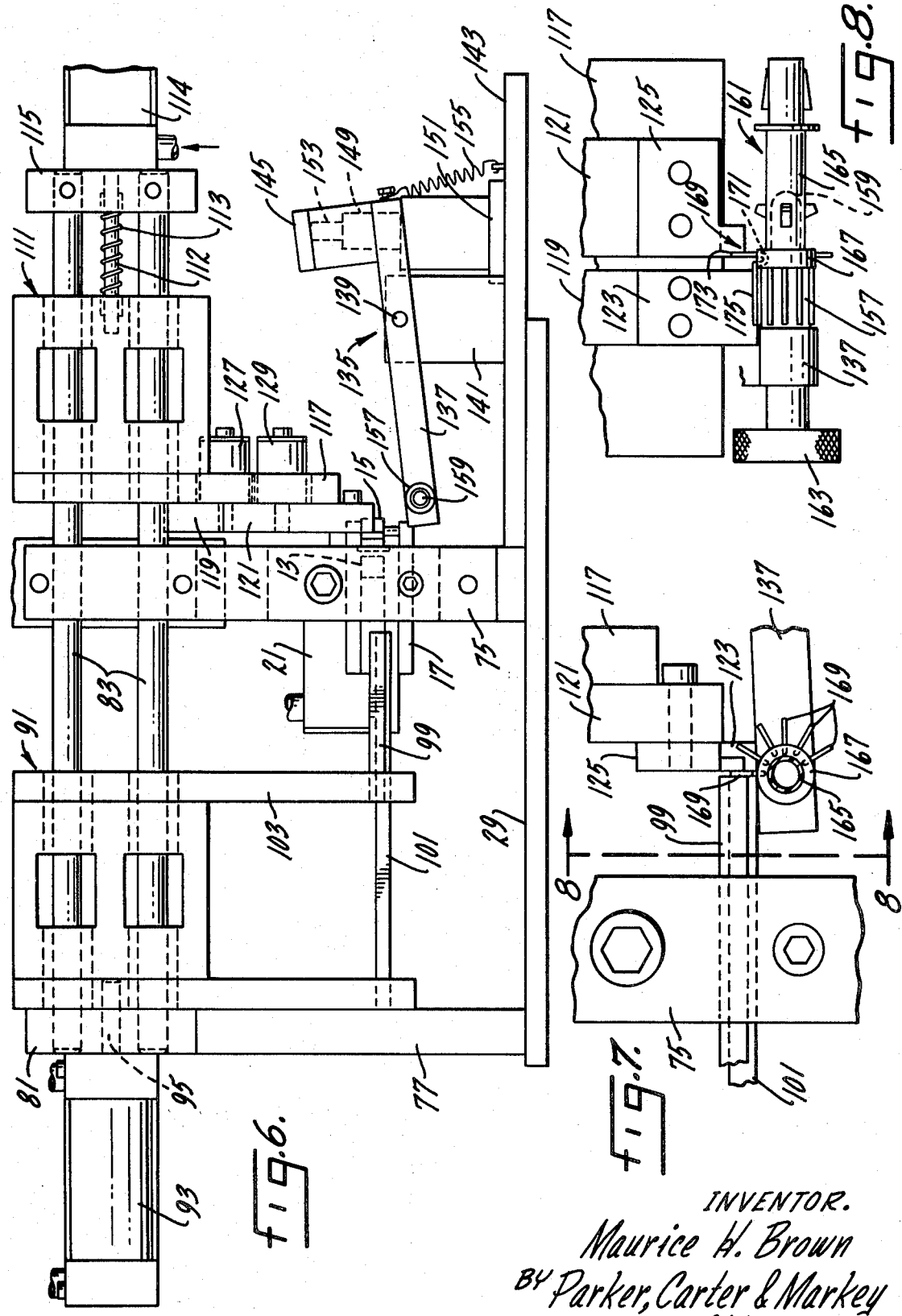

3,714,708

WIRE TERMINAL MAKING AND ASSEMBLING

SUMMARY OF THE INVENTION

This invention is concerned with a terminal and a method of and apparatus for forming the terminal from a continuous piece of wire and inserting it in a thermoplastic support member.

An object of this invention is a terminal which can be formed from a continuous piece of wire.

Another object is a method of forming terminals from a continuous piece of wire.

Another object is an apparatus for forming terminals and inserting them in a thermoplastic support member.

Another object is a method of attaching a terminal to a thermoplastic support member.

Another object is a terminal which resists pull-out when embedded in a thermoplastic material.

Another object is a terminal that may be attached to thermoplastic materials of relatively thin cross-section.

Another object is a terminal which may be readily fused into attachment with a thermoplastic material.

Another object is a terminal formed so that it may be easily heated by electrodes.

Another object is a terminal having wire attachment legs arranged so that the legs of adjacent terminals in a support do not interfere with one another.

Another object is a method of simultaneously heating a terminal and inserting it in a piece of thermoplastic material.

Another object is a coil form having terminal legs arranged to facilitate attachment of wires thereto.

Other objects may be found in the following specification, claims and drawings.

BRIEF DESCRIPTION OF THE DRAWINGS

The invention is illustrated more or less diagrammatically in the following drawings wherein:

FIG. 2 is an enlarged vertical cross-section view taken along line 2—2 of FIG. 1 with parts omitted for clarity;

FIG. 3 is a partial cross-sectional view taken along line 3—3 of FIG. 2;

FIG. 4 is an enlarged partial view similar to that of FIG. 2 and showing the wire advanced to the terminal forming position;

FIG. 5 is a view similar to FIG. 4 and showing a terminal formed and separated from the continuous piece of wire;

FIG. 6 is a side elevational view of the apparatus of FIG. 1;

FIG. 7 is an enlarged partial view of the apparatus of FIG. 6 showing a terminal being inserted in a thermoplastic support member; and FIG. 8 is a partial cross-sectional view taken along line 8—8 of FIG. 7.

DESCRIPTION OF THE PREFERRED EMBODIMENT

Figure 1:
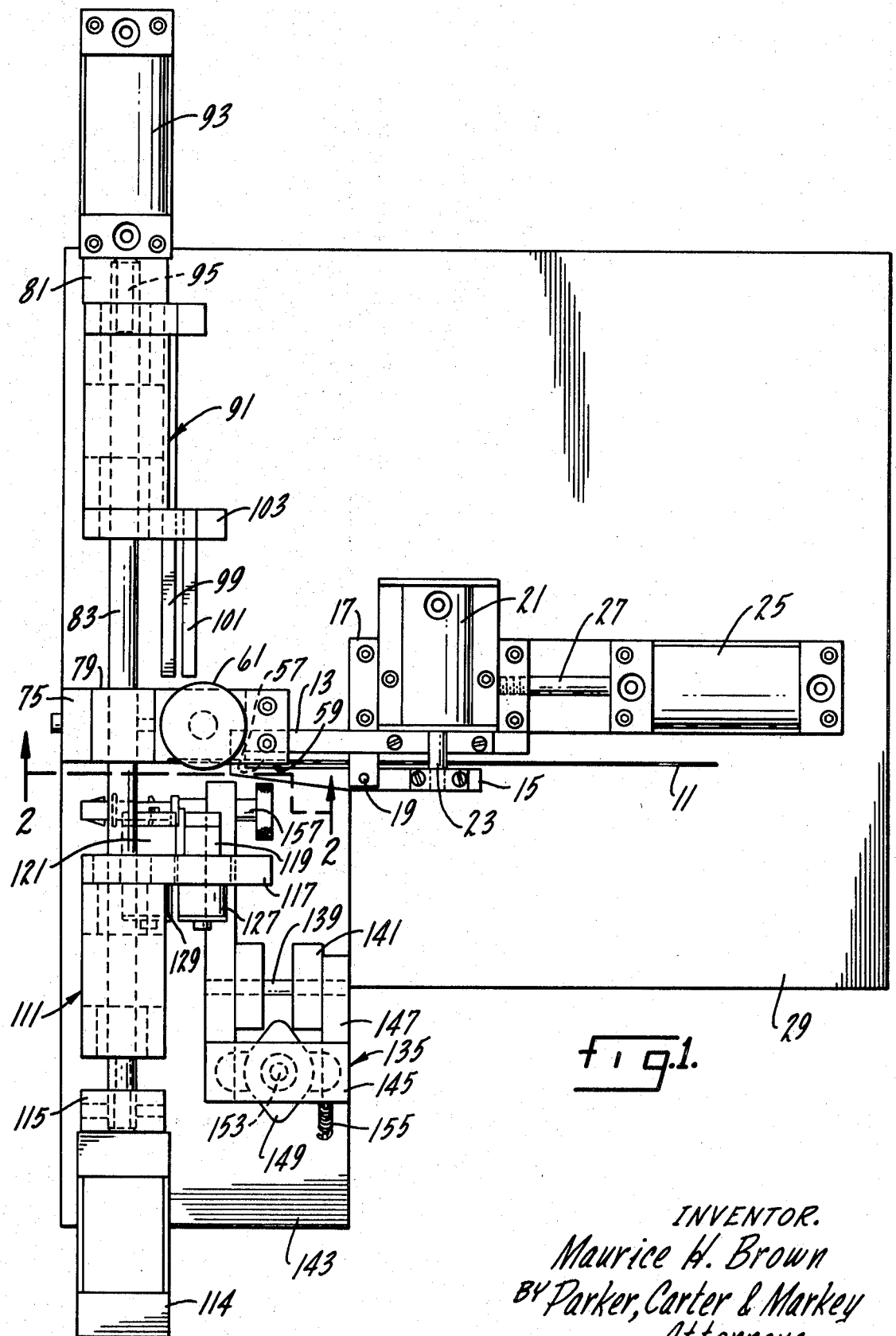
FIG. 1 is a top plan view of an apparatus embodying the novel features of this invention.

FIG. 1 shows an apparatus for forming a terminal and inserting it in a thermoplastic support member to form an object such as a coil form. A continuous wire 11 is fed from a reel or other supply (not shown) by means of wire gripping fingers 13 and 15. Finger 13 is fixed to carriage 17 while finger 15 is pivotally mounted thereon at 19. Air cylinder 21 is connected to finger 15 by means of piston rod 23. This cylinder may be actuated to move finger 15 into or out of gripping contact with the wire 11. Carriage 17 is moved in a linear path by means of air cylinder 25 which is connected thereto by piston rod 27. The air cylinder 25 is mounted on a base plate 29.

Referring especially to FIG. 2, an upstanding framework 35 having an opening 37 extending horizontally therethrough is also mounted on the base plate 29. A vertically slidable punch 39 is mounted on the framework for movement in the opening 37. The punch has a bending blade 41 and a cutting edge 43. Die blocks 45, 47 and 49 are located in the opening 37 with blocks 45 and 47 having notched portions which cooperate to form a groove 51 which receives the bending blade 41. The top of block 47 is lower than the top of block 49 to permit the cutting edge 43 of punch 39 to move past corner edge 53 of block 49 to cut the wire 11 supported on the top of block 49. Die block 45 is cut away at 55 to provide clearance for the wire 11 in the manner shown in FIG. 4. A groove 57 is formed in the side face 59 of the framework 35 to receive the wire 11. See FIG. 3 for details. An air cylinder 61 is mounted on the frame 35 and is equipped with a piston rod 63 which extends through an opening 65 in the top member 67 of the frame 35 to connect to the punch 39.

Support columns 75 and 77 (FIG. 6) are mounted on the base plate 29 with the column 75 connected to the upstanding framework 35 and the column 77 located at one end of the base plate. Guide rods support plates 79 and 81 are mounted respectively on columns 75 and 77 with support plate 79 attached to the side of column 75 (FIG. 2) and support plate 81 mounted on the top of column 77 (FIG. 6). Guide rods 83 extend through openings 85 in the support plates and are secured to the plates by threaded fasteners which are not shown.

An ejector carriage 91 (FIG. 1) rides on the guide rods 83 and is moved along the guide rods by an air cylinder 93. The air cylinder has a piston rod 95 which connects to the carriage. A pair of horizontally spaced, vertically offset ejector pins 99 and 101 are mounted on an end plate 103 of the ejector carriage which faces the upstanding framework 35. These ejector pins project from the end plate in the direction of the framework. As is most clearly shown in FIG. 2, the ejector pins 99 and 101 aligned with the opening 37 in the framework 35 with the pin 99 aligned to pass through a cutout notch 105 in the die block 45 and the pin 101 aligned with the top edge of the die block 47.

Also mounted on the guide rods 83 is an electrode carriage 111 shown in FIGS. 1 and 6. This carriage is located on the opposite side of the framework 35 from the ejector pin carriage 91. The carriage is moved towards the upright framework 35 by means of a spring 113 which is mounted on a piston rod 112 of an air cylinder 114. The air cylinder is mounted on a plate 115 fastened to the ends of the guide rods 83 and the spring engages this plate and the carriage. The air cylinder, when pressurized, locks the spring in its compressed state and, to at least some degree, may control the rate of expansion of the spring when the cylinder pressure is released.

An electrode support plate 117 is attached to the end of the carriage 111 facing the upright support 35 and electrodes 119 and 121 are attached to this plate. The electrodes are provided with projecting portions 123 and 125 at the lower ends thereof which portions engage the wire 11. Coils 127 and 129 are mounted on the electrode support plate 117 for heating the electrodes.

A work positioner mechanism 135 shown in FIGS. 1, 6, 7 and 8 includes an arm 137 which is pivotally mounted on shaft 139. The shaft is journalled on spaced uprights 141 which are mounted on a plate 143. The plate 143 partially extends over and rests on the base plate 29. An inverted U-shaped member 145 connects to one end of the arm 137 and to one end of an arm 147 which is connected to the pivot shaft 139 on the opposite side of the uprights 141 from the arm 137. An air cylinder 149 is mounted on a support 151 which rests on the plate 143. The air cylinder has a piston rod 153 which engages the underside of the U-shaped member 145 to elevate one end of the arm 137. A spring 155 attached to the end of the arm 147 and to the plate 143 returns this end of the arm to its lowered position when the piston rod of the air cylinder is retracted.

A support and indexing member 157 is mounted at the end of the arm 137 adjacent the upright framework 35. This member includes a mandrel 159, which fits into and supports a thermoplastic member 161 mounted thereon, and an indexing knob 163.

The thermoplastic member 161 has a cylindrical body 165 which may either be solid or tubular. An annular flange 167 is located at one end of the body 165. Terminals 169 are attached to the thermoplastic member. Each terminal is generally U-shaped with a bight portion 171, a straight leg 173 and a longer leg 175 which is bent intermediate its ends to extend at right angles to the straight leg. The bight portion of each terminal is embedded in the annular flange terminal 167 and is positioned with its straight leg 173 extending radially of the flange and the bent portion of the longer leg extending parallel to the axis of the thermoplastic member.

The use, operation and function of this invention are as follows:

The wire 11 is fed by the fingers 13 and 15 through the slot 57 in the face 59 of the upright framework 35 and into the opening 37 in the upright framework 35. As can be best seen in FIG. 2, the free end of the wire 11 is positioned at the edge 53 of the die block 49. When the air cylinder 21 is actuated, the piston rod 23 moves the finger 15 about the pivot 19 clamping wire 11 between the tips of fingers 13 and 15. Then, the air cylinder 25 is actuated. This moves the carriage 17, the fingers 13 and 15 and the wire 11 toward the bending blade 41 of the punch 39 and to the position shown in FIG. 4 of the drawings. The air cylinder 21 is then retracted, releasing the fingers 13, 15 from gripping contact with the wire 11. The cylinder 25 is then retracted to move the carriage 17 in the reverse direction until the fingers reach the position shown in FIGS. 1 and 2, leaving the wire 11 in the position shown in FIG. 4.

Upon retraction of the fingers 13, 15, the air cylinder 61 is actuated moving its piston rod 63 and the attached punch 39 downwardly from the position shown in FIG. 2 to the position shown in FIG. 5. When the punch 39 is moved to the position shown in FIG. 5, a portion of the wire is severed from the main body 11 by the cutting edge 43 of the punch. The bending blade 141 deforms the severed portion of wire into a modified U-shaped terminal 169 having a bight portion 171, a straight leg 173 and a longer leg 175 which is bent intermediate its length to extend at right angles to the straight leg.

After the terminal 169 is formed, the air cylinder 61 retracts the punch 39. The air cylinder 93 is then actuated moving the piston rod 95 and the carriage 91 toward the upright framework 35 to bring the ejector pins 99 and 101 into contact with the terminal 169. As is best seen in FIGS. 5 and 8, ejector pin 99 engages the straight leg 173 of the terminal while ejector pin 101 engages the bent leg 175 of the terminal. As the ejector pins 99 and 101 engage the terminal 169 to remove it laterally from the die blocks 45, 47, air pressure is released from cylinder 114 and the electrode carriage 111 is moved by means of the spring 113 towards the upright framework 35 to bring the electrodes 123 and 125 into contact with the terminal 169.

Continued movement of the ejector pin carriage 91 to the right as viewed in FIG. 6 will move the carriage 111 to its fully retracted position shown in FIG. 1 and will bring the electrodes 123 and 125 and the ejector pins 99 and 101 to the position shown in FIG. 7. When the terminal 169 is moved to the position shown in FIG. 7, but before the arm 137 is elevated, current is being passed through the ejector pins and their heating coils 127 to heat the terminal 169 to a temperature above the melting temperature of the thermoplastic support member 161. To prevent the current from being short circuited through the pusher rods, the pusher rod 101 is insulated from its carriage.

When the terminal 169 is in a position shown in FIG. 7, the piston rod 153 of the air cylinder 149 is retracted to allow the spring 155 to rotate the arm 137 about its pivot 139 thereby lifting the mandrel 157 and the thermoplastic member 161 mounted thereon to the position shown in FIG. 7. The upward movement of the thermoplastic member 161 into engagement with the terminal 169 and embeds the bight portion 171 of the terminal in the annular flange 167 of the thermoplastic member.

As can be seen in FIG. 8, the bight portion 171 of the terminal is embedded in the thermoplastic annular ring 167 to the depth of the bent portion of the leg 175. The thermoplastic material will flow in behind the bight portion 171 of the terminal, locking the terminal into position in the thermoplastic support member.

After the terminal has been embedded, the air cylinder 93 is retracted, returning the ejector rods 99 and 101 to the position shown in FIG. 1. At the same time, the air cylinder 114 is energized to prevent movement of the carriage 111 by spring 113. The air cylinder 149 is then actuated lowering the mandel end 157 of the arm 137 to move the thermoplastic member 161 and attached terminal away from the electrodes 123 and 125. The mandrel may be indexed either manually or automatically by means of the knob 163 to its next position so that the annular flange 167 of the thermoplastic member 161 will be ready to receive another terminal. The apparatus is now ready for another cycle of operation.

The wire 11 used to form the terminal 161 has a diameter of approximately 0.025 inches. The bending blade 41 of the punch 39 has a thickness of approximately 0.015 inches so that the total width of the bight portion of the terminal will be approximately 0.065 inches with a gap of 0.015 inches between the wire portions forming the bight. The terminal 161 may be inserted in a thermoplastic section having a thickness as little as 0.085 to 0.090 inches since the maximum width of the U-shaped bight portion is approximately 0.065 inches. In spite of the relatively thin cross-section of the thermoplastic material, the terminal will have good holding ability because the thermoplastic material upon melting will run into the 0.015 inch gap between the legs of the bight.

The coil form of this invention permits coil wires (not shown) to be wound around the tubular body 165 of the thermoplastic member 161 with these wires attached to the straight legs 173 of the terminals 169 by dip soldering the connections. The shape of the terminal and its location on the annular flange 167 of the thermoplastic support 161 positions the ends of the legs 173 where they can be readily dip soldered. The straight legs 169 which are then connected to the coil wires may be folded away from the legs 175 and in a direction parallel to the tubular portion 165 of the thermoplastic member for compactness but this step is not shown. The bent legs 175 may readily be inserted in a structure such as a circuit board, which is not shown, but which would normally extend at right angles to the axis of the thermoplastic support 161.

The attachment of the terminal 169 to the thermoplastic support member 161 is accomplished solely by means of the heat of the terminal which melts the thermoplastic material allowing the bight portion of the terminal to be inserted in the thermoplastic material. The melted thermoplastic material then flows behind the bight portion to fill in behind the terminal thereby locking the terminal in position.

I claim:

1. A method of forming a terminal and inserting it in a thermoplastic support piece including the steps of:

forming a portion of an elongated piece of wire into a desired configuration and separating said portion from said elongated piece of wire to form a planar terminal having at least two legs, moving said terminal from said forming position in contact with a pair of electrodes to an embedding position with each leg of said terminal contacting a separate electrode, passing electrical current through said electrode to heat said terminal, moving said terminal and a thermoplastic support member into engagement with each other to embed and fuse the terminal in the thermoplastic support member with the legs thereof extending outwardly from said support member, and moving the electrodes out of engagement with said terminal when said terminal is embedded in and fused to said thermoplastic support member.

2. The method of claim 1 further characterized in that said thermoplastic support member is moved into contact with said terminal while said terminal is held in each embedding position in contact with said electrodes.

3. The method of claim 2 further characterized in that a number of terminals are inserted sequentially in said thermoplastic support member.

4. The method of claim 1 further characterized in that said terminal is moved from said forming position in supporting engagement with said electrodes in a direction extending at right angles to the length of said elongated piece of wire from which said terminal is formed.

5. The method of claim 4 further characterized in that said terminal is embedded in said thermoplastic support member by movement in a direction extending at right angles to its direction of movement from said forming position.

6. The method of claim 1 further characterized in that said terminal is formed in the shape of a planar modified U-shaped configuration having a bent first leg and a straight second leg with the legs connected by a bight portion, the second leg extending at right angles to the bent portion of the first leg, and said terminal and said thermoplastic support member are moved into engagement with each other to embed and fuse the bight portion of the terminal in the thermoplastic support member generally to the depth of the bent portion of said first leg.

* * * * *